Patented Oct. 19, 1937

2,096,633

UNITED STATES PATENT OFFICE 2,096,633

POLYCUMARONE COMPOSITIONS

Erich Gebauer-Fuelnegg, deceased, late of Evanston, Ill., by Marie Gebauer-Fuelnegg, administratrix, Evanston, Ill., and Eugene W. Moffett, Chicago, Ill., assignors to Marbon Corporation, Chicago, Ill., a corporation of Delaware No Drawing. Application January 7, 1937, Serial No. 119,454

4 Claims. (Cl. 106—23)

In our copending application Serial No. 722,252 filed April 25, 1934, we disclose the use of rubber hydrohalide - polycumarone compositions for coating on paper. The present invention is a continuation in part of the above application and is concerned particularly with compositions of rubber hydrohalide and polycumarone and polyindenes.

The polycumarones and polyindenes are extremely compatible with the rubber hydrohalides. Solutions of polycumarones or polyindenes and rubber hydrochlorides in benzol can be cast into homogeneous, transparent films, or coated on paper or other surfaces. The high adhesive properties of the compositions make them particularly suitable for coating on hard non-porous surface such as glassine paper.

It is an object of this invention to provide an improved thermoplastic composition.

Another object is to provide a liquid coating composition of high adhesive quality.

Another object is to provide thin, transparent homogeneous films composed essentially of a rubber hydrochloride and a resin.

Other objects of this invention will be evident from the following specification and accompanying claims.

While it is possible to produce thin, transparent sheets from solutions containing solely rubber hydrochloride and a volatile solvent, and it is possible to coat such solutions on paper and other surfaces, it is preferable to add certain other materials which act as plasticizers, homogenizers or bonding agents. Any such material which is compatible with rubber hydrochloride in solution and which is non-blooming may be employed. After experimenting with various materials, it was found that the polycumarones and polyindenes were suitable. These materials may be liquids or solids. The liquids and soft solids act as plasticizers; the hard solids as homogenizers. All act to increase the adhesive power of the rubber hydrochloride compositions.

When the polycoumarons are liquids and tend to make the cast sheets tacky they should be used only in amounts between ½ and 3%, based on the rubber hydrochloride solution. However, where they do not produce a tacky sheet, they may be used in amounts up to 5% or even more. For example, the hard polycumarones may be used in amounts up to 15 to 20% for self-sustaining sheets, and up to 80% for coating compositions.

The following formula of a satisfactory coating composition is not to be considered as a limitation on the invention since the proportions are not critical, but it is to be understood as giving desirable proportions which have been found to be operative and desirable for coating glassine paper:

| | | |
|---|---|---|
| Amorphous saturated asymmetrical rubber hydrochloride | 100 | 100 |
| Cumarone resin (M. P. 100° C.–160° C.) | 50 | 10 |
| Paraffin wax | 5 | 5 |
| Age retarder | 2 | 2 |

It is to be understood that other types of rubber hydrochloride may be used than amorphous asymmetrical rubber hydrochlorides. Crystalline rubber hydrochlorides obtained by reacting solutions of rubber with gaseous hydrogen chloride are satisfactory. Furthermore, although it is preferred to use a substantially saturated rubber hydrochloride of viz. 29% chlorine content it is possible to use a partially saturated rubber hydrochloride of viz. 25% chlorine content and less with, however, consequent loss in such valuable properties as oil and aging resistance, and hardness. Moreover, the type of polycumarone may be varied with results which are apparent. The soft polycumarones act as plasticizers and are particularly useful for the substantialy saturated crystalline rubber hydrochlorides.

We claim:

1. A composition of matter comprising in intimate admixture a rubber hydrohalide and a polycumarone.

2. An adhesive composition comprising a rubber hydrochloride and a cumarone resin.

3. A coating composition comprising a rubber hydrochloride, a polycumarone, and a solvent.

4. A composition comprising a substantially saturated rubber hydrochloride and as a plasticizer therefor a soft polycumarone.

MARIE GEBAUER-FUELNEGG,
*Administratrix of the Estate of Erich Gebauer-Fuelnegg, Deceased*
EUGENE W. MOFFETT.